United States Patent [19]

Tindell

[11] Patent Number: 5,485,975
[45] Date of Patent: Jan. 23, 1996

[54] SLOTTED COWL INLET LIP FOR INTRODUCING HIGH PRESSURE AIR

[75] Inventor: Runyon H. Tindell, Old Bethpage, N.Y.

[73] Assignee: Northrop Grumman Corporation, Los Angeles, Calif.

[21] Appl. No.: 277,506

[22] Filed: Jul. 19, 1994

[51] Int. Cl.⁶ .................................................. B64D 29/06
[52] U.S. Cl. ........................ 244/53 B; 244/207; 137/875; 137/885; 137/486; 74/89.17
[58] Field of Search .................................. 244/53 B, 207, 244/208, 130, 52, 12.5, 23 D; 137/875, 885, 486, 15.1, 15.2; 251/299, 30; 74/89.17

[56] References Cited

U.S. PATENT DOCUMENTS

| | | | |
|---|---|---|---|
| 2,624,281 | 1/1953 | McNally | 244/130 |
| 3,063,658 | 11/1962 | Griswold, II | 244/207 |
| 3,465,988 | 9/1969 | Orr | 244/208 |
| 4,671,318 | 6/1987 | Benson | 137/486 |
| 4,872,360 | 10/1989 | Lew et al. | 74/89.17 |

FOREIGN PATENT DOCUMENTS

| | | | |
|---|---|---|---|
| 977072 | 3/1951 | France | 244/207 |

*Primary Examiner*—Andres Kashnikow
*Assistant Examiner*—Tien Dinh
*Attorney, Agent, or Firm*—Terry J. Anderson; Karl J. Hoch, Jr.

[57] ABSTRACT

The lower lip of an aircraft inlet cowl has a first transverse slot formed through an upper surface of the lower lip while a second transverse slot is formed through a lower surface of the lip. A rotating vane is transversely located in the interior of the lip, between the upper and lower slots. A duct located within the interior of the lower lip delivers pressurized engine bleed air to the rotating vane. Selectively driven gears position the vane so as to block either one or the other of the slots, depending upon aircraft speed, so that normal cowl inlet air is energized in the vicinity of the slot outlet. This prevents separation of the normal inlet airflow from the cowl surface - and reduces drag that would otherwise develop.

5 Claims, 2 Drawing Sheets

5,485,975

SLOTTED COWL INLET LIP FOR INTRODUCING HIGH PRESSURE AIR

FIELD OF THE INVENTION

The present invention relates to aircraft engine cowls, and more particularly to a slotted inlet lip which selectively energizes stagnant air flow - which would normally cause drag.

BACKGROUND OF THE INVENTION

Aircraft engine air inlet performance at low speed, in the range of Mo=0.20, ,and at high cruise speed, in the range Mo=0.70–0.80, can directly affect the aircraft size and/or the mission capability. During low speed operation inlet total pressure recovery must be maximized to achieve competitive levels of single engine rate of climb. In the high speed cruise operation, inlet spillage drag must be minimized to achieve low values of installed specific fuel consumption. If spillage drag causes cruise fuel consumption to be too high, the aircraft will have to be relatively heavy to meet a given radius requirement. If low speed single engine rate of climb cannot be met due to low inlet total pressure recovery, then the engine will have to be relatively larger, driving the aircraft to be even heavier.

Both low speed and high speed requirements can generally be met by employing a thick inlet cowl lip, having generous internal and external contours. The more generous contours preclude the laminar airflow separation that otherwise occurs in both modes of operation. But modern requirements that reflect high survivability characteristics through low observable signatures dictate that inlet cowl lips be thin.

Several approaches to providing good low speed performance for thin lip inlets have been employed in the past. These include auxiliary inlets of various designs, rotating lips, and blowing of high pressure air. Auxiliary inlets provide extra openings in the duct having generous entry contours, thus reducing the amount of inflow that will flow over the sharp lips of the main inlet. Rotating lips transform the sharp leading edge into a more generous contour.

Variable position lips, similar to the rotating lip, have been employed to preclude the external lip laminar airflow separation responsible for large spillage drag at high speeds. There is no known application of blowing high pressure air over external lip surfaces to preclude separation and thereby reduce spillage drag.

BRIEF DESCRIPTION OF THE PRESENT INVENTION

The present invention employs the blowing of high pressure engine bleed air to solve both the low speed and high speed inlet problems. It does this with the least mechanical complexity, greatest reliability and with no large load bearing moving surfaces.

Specifically, the present invention employs oppositely disposed slots formed on the upper and lower surface of a lower engine cowl lip. Within the cowl lip is a selectively positioned vane for directing high pressure air, in the nature of engine bleed air, to either of the slots, depending upon whether the aircraft is operating at low speed or high cruise speed.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 2:
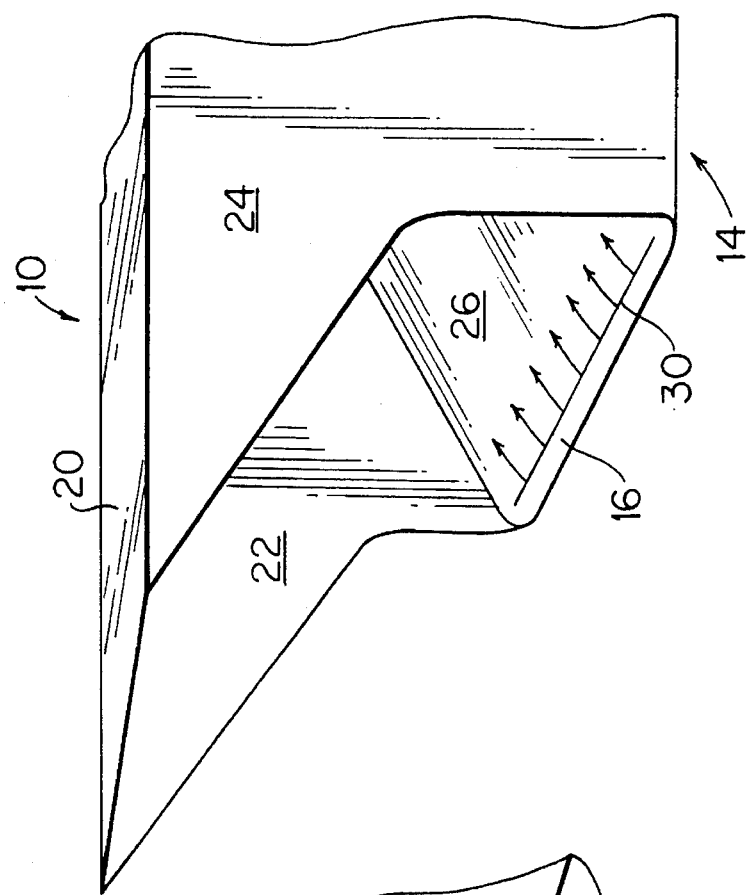
FIG. 2 is a view of the cowl shown in FIG. 1 but with a second slot - which is formed in an upper surface of the lower cowl lip.
Figure 1:
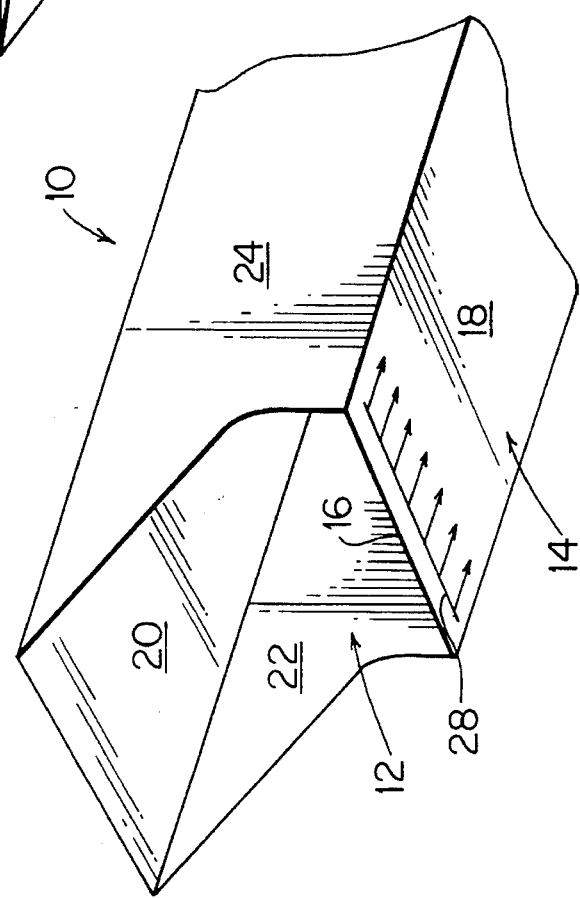
FIG. 1 is a diagrammatic view of a cowl in accordance with the present invention, wherein a lower slot in the lower cowl lip is indicated.

It should be understood that the invention is not limited to the exact details of construction shown and described herein for obvious modifications will occur to persons skilled in the art. Reference numeral 10 in FIG. 1 generally indicates an inlet cowl of an aircraft jet engine which includes an inlet 12 bounded by the four walls of the cowl, namely lower wall 14, upper wall 20, left wall 22 and right wall 24. The lower surface 18 of the lower wall 14 has a slot 28 formed transversely therein, at a distance proximate to the rounded leading edge 16 of the lower wall 14. The slot is formed where stagnant air might otherwise develop at high speed cruise power conditions - which would disadvantageously produce drag. FIG. 2 illustrates a second slot 30 transversely formed in the upper surface 26 of lower wall 14, and again extending transversely, adjacent the rounded leading edge 16. The slot 30 is positioned where stagnant air would normally develop when an aircraft operates at low speed. The slots 28 and 30 act as outlets for high pressure air as will now be explained in connection with FIG. 4.

Figure 4:
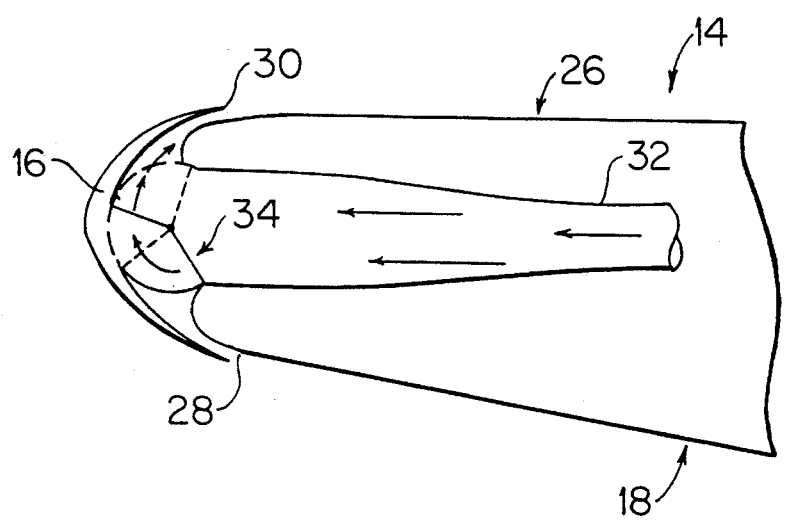
FIG. 4 is a diagrammatic sectional view, taken along section line 4—4 of FIG. 3, for illustrating the two positions of the rotating vane shown in FIG. 3.

In FIG. 4, a conduit 32 is seen positioned between the lower surface 18 and upper surface 26 of the lower cowl lip 14. The left indicated end of the conduit 32 is sealed by a selectably positioned vane so that in the vane's solid line depiction, high pressure air is diverted upwardly, through slot 30. This introduced air will energize the inlet stream at points adjacent the slot 30 - where stagnant inlet air generally develops during low speed. The small amount of introduced high pressure air energizes the stream and increases its inlet speed so as to prevent its separation. In the dotted line position of the vane, the upper slot 30 is sealed and instead, the lower slot 28 becomes uncovered to allow high pressure air to exit therefrom. This energizes an otherwise stagnant inlet stream in the vicinity of slot 28 - which would otherwise cause drag during high speed. The position of the rotating vane is automatically selected depending upon the speed of an aircraft.

Figure 3:
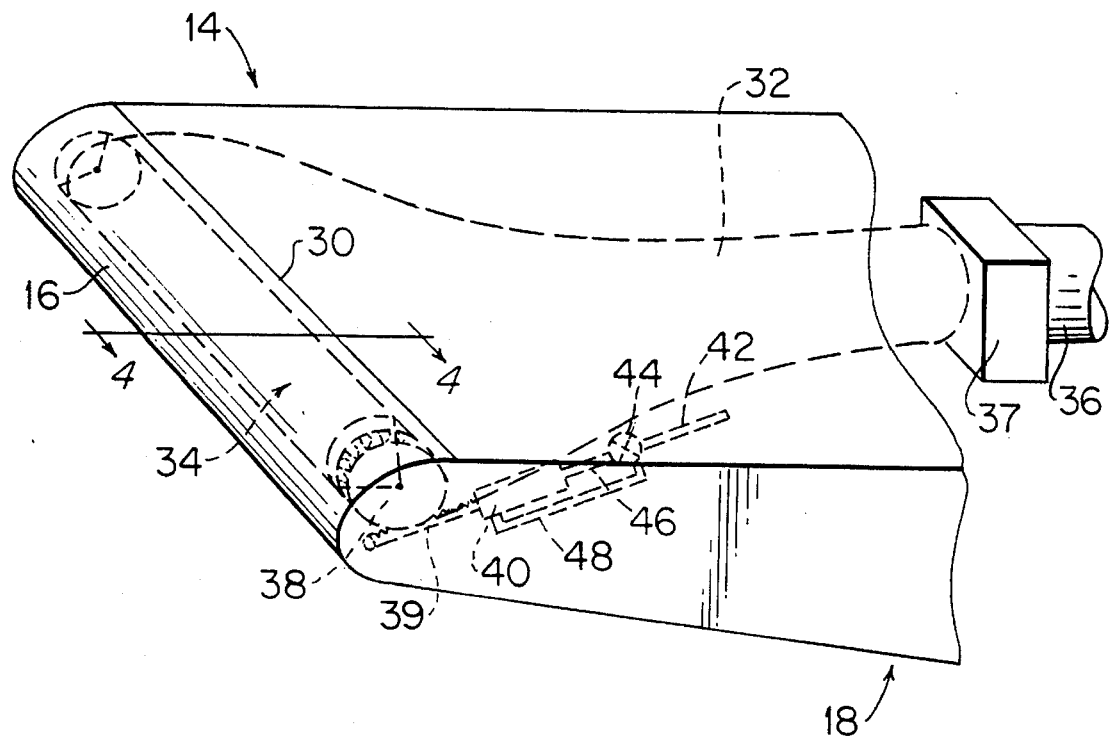
FIG. 3 is a diagrammatic perspective view of the present invention illustrating a rotating vane for selectively directing high pressure air to either the upper or lower slots shown in FIGS. 1 and 2.

FIG. 3 illustrates the internal mechanism of the present invention. Engine bleed air is introduced along conduit section 36 and is metered by a valve 37. The conduit 32 previously discussed in connection with FIG. 4 is seen to extend between the outlet of valve 37 and its left end blocked by rotating vane 34.

In the preferred embodiment of the present invention, the rotating vane is equipped with end gear 38 which acts as a pinion and cooperates with corresponding rack gear 39. The rack gear is reciprocated by a hydraulic actuator 40. Hydraulic fluid is introduced at line 42 and selectively branches through branch lines 46 and 48, as determined by the hydraulic selector valve 44. The valve 44 is displaced, in accordance with the speed operation of the aircraft. Accordingly, the hydraulic fluid introduced in line 42 will either flow through branch 46 or 48 thereby causing a corresponding reciprocation of rack gear 39 to respectively position the vane at slot 28 or 30.

The present invention, as described, is able to provide the same level of performance as other prior art devices but with the added advantages of being lighter than an auxiliary inlet and rotating cowl lip. The fact that the present invention utilizes blow high pressure air on the top and bottom surfaces of the lower cowl lip (using a single rotating vane) results in improved low and high speed performance - by reducing drag.

I claim:

1. An air delivery system for an air inlet conduit, the conduit having a lower lip, the system comprising:

a first transverse slot formed through an upper surface of the lower lip and positioned in parallel adjacency to a leading edge of the lip;

a second transverse slot formed through a lower surface of the lower lip and positioned in parallel adjacency to the leading edge of the lip;

vane means transversely located in the interior of the lip, between the upper and lower surfaces, and internally aligned with the first and second transverse slots;

vane members extending from the vane means for selectively blocking one or the other of the slots;

a duct located within the interior of the lower lip for delivering pressurized air to the vane means; and means for selectively displacing the vane means for blocking one or the other of the slots.

2. An air delivery system for an aircraft inlet cowl, the cowl having a lower lip and comprising:

a first transverse slot formed through an upper surface of the lower lip and positioned in parallel adjacency to a leading edge of the lip;

a second transverse slot formed through a lower surface of the lower lip and positioned in parallel adjacency to the leading edge of the lip;

rotating vane means transversely located in the interior of the lip, between the upper and lower surfaces, and internally aligned with the first and second transverse slots;

vane members extending from the vane means for selectively blocking one or the other of the slots;

a duct located within the interior of the lower lip for delivering pressurized engine bleed air to the vane means;

means for selectively displacing the vane means for blocking one or the other of the slots; and valve means located at an inlet of the duct for controlling engine bleed airflow therethrough.

3. The system set forth in claim 2 further comprising:

driven first gear means connected to the rotating vane means; and driving second gear means meshing with the first gear means for selectively displacing the vane means thereby blocking one or the other of the slots while allowing airflow thorough the other non-blocked slot.

4. The system set forth in claim 3 further comprising: hydraulic means connected to the second gear means for displacing the second gear means and the vane means to a selected position relative to the slots.

5. The system set forth in claim 3 further comprising:

hydraulic actuation means connected to the second gear means for displacing the second gear and the connected vane means to a selected position relative to the slots;

the first and second gear means being pinion and rack gears, respectfully; and hydraulic switch means connected to the actuation means for reciprocating the rack gear between two positions corresponding to slot blocking positions of the respective first and second slots.

* * * * *